United States Patent

[11] 3,603,729

| [72] | Inventor | Martin Sperber<br>Cranford, N.J. |
|---|---|---|
| [21] | Appl. No. | 807,039 |
| [22] | Filed | Mar. 13, 1969 |
| [45] | Patented | Sept. 7, 1971 |
| [73] | Assignee | Squires-Sanders, Inc.,<br>Liberty Corner, N.J. |

[54] MOTION DETECTOR SYSTEM WHICH SAMPLES ONLY A PRESELECTED AREA
18 Claims, 10 Drawing Figs.

| [52] | U.S. Cl. | 178/6.8 |
|---|---|---|
| [51] | Int. Cl. | H04n 7/18 |
| [50] | Field of Search | 178/6, 6.8,<br>DIG. 3, DIG. 21 |

[56] References Cited
UNITED STATES PATENTS

| 2,561,197 | 7/1951 | Goldsmith | 178/6.8 |
|---|---|---|---|
| 2,597,636 | 5/1952 | Hall et al. | 343/7.7 |
| 3,049,588 | 8/1962 | Barnett | 178/6 |
| 3,336,585 | 8/1967 | Macovski | 178/6 |
| 3,341,653 | 9/1967 | Kruse, Jr. | 178/6.8 |
| 3,476,947 | 11/1969 | Burney | 178/6 |
| 3,488,436 | 1/1970 | Burney | 178/6.8 |
| 3,507,992 | 4/1970 | Foote | 178/6.8 |

*Primary Examiner*—Richard Murray
*Assistant Examiner*—Richard K. Eckert, Jr.
*Attorney*—Shlesinger, Arkwright & Garvey ABSTRACT: A selected part of a television surveillance camera field is selected for motion detection by variable *x–y* selection circuits; each successive signal sweep of this sample area is alternately fed to one of a pair of capacitive memory circuits the output of which are supplied to a differential comparator circuit to detect changes in the signals between successive sweeps of the selected area, a change in signal producing an output from the differential comparator which activates an alarm.

INVENTOR
Martin Sperber

BY Shlesinger, Arkwright & Garvey
ATTORNEYS

INVENTOR
Martin Sperber

Fig. 10

MOTION DETECTOR SYSTEM WHICH SAMPLES ONLY A PRESELECTED AREA

BACKGROUND OF INVENTION

This invention relates to a monitor system for closed circuit television surveillance systems, where movement is to be detected.

The use of automatic monitoring systems in industry has grown tremendously in the last 25 years.

Such systems perform a wide variety of functions, and have become an indispensable part of the equipment requirements in many industries.

Security and surveillance systems have come into widespread use in industry and the use of such systems is becoming more widespread. Security systems can be either simple or complex, depending upon the desired application. There are available the simple photocell light beam units, microwave units, sonic devices, and closed circuit television systems.

There has been widespread acceptance of closed circuit television for plant security applications. Such systems require the visual inspection of all of the television monitors by the security guard. In instances where a great number of television monitors are to be observed, a viewing problem can arise.

In view of this, there is a need for a reliable automatic detector system to be used with television surveillance systems which will detect any changes in a monitored area and alert the security guard to such a change.

Such a system will make it possible for a security guard to adequately scan many additional television monitors, while also reducing the chance that the security guard will fail to see a change on one of his television monitor units.

Television monitor units have been developed to perform this function, but such units have been highly complex, expensive, bulky, and have required auxiliary equipment. Such systems have also required frequent maintenance.

There is a need for an economical, compact and highly reliable automatic motion detector unit, which can be integrated directly with existing and future closed circuit television systems.

SUMMARY OF INVENTION

Accordingly, it is a principal object of this invention to provide a video motion detector unit with closed circuit television circuits which is simpler and more compact than previously existing devices.

It is another object of this invention to provide a reliable automatic motion detector alarm unit that can be integrated directly with existing and future closed circuit television systems.

It is a still further object of this invention to provide a motion detector system which will function as an automatic security alarm system triggered by motion in any prescribed sampling area.

It is a still further object of this invention to provide a motion detector system which can be directly used with existing closed circuit TV surveillance systems and does not require expensive auxiliary equipment.

It is a still further object of this invention to provide a motion detector system which will show the sampling area on the television monitor unit.

It is a still further object of this invention to provide a simple transistorized motion detector unit which can be directly connected into an existing closed circuit television system without any modification to either the television camera or the television monitor.

It is a still further object of this invention to provide a closed circuit television system wherein a plurality of cameras and motion detectors can be operated simultaneously with a single video monitor.

It is a still further object of this invention to provide a new method of motion detection using a sophisticated state of the art motion detector unit which can scan the sample area at successive intervals, and compare the successive scans for change in signal.

It is another and still further object of this invention to use a motion detector with simplified memory circuits for storing successive signals from the sample area.

It is a still further object of this invention to provide a unique automatic gain control circuit to make it possible to use the motion detector unit with different television systems without requiring modification or adjustment and automatic compensation for varying light intensity within total field of view of camera.

It is also an object of this invention to provide a very sensitive, balanced, amplifier circuit for amplifying the signals in the memory circuits.

These and further objects of the invention will become apparent from he following description and appended claims.

DETAILED DESCRIPTION

Figures 1, 2:
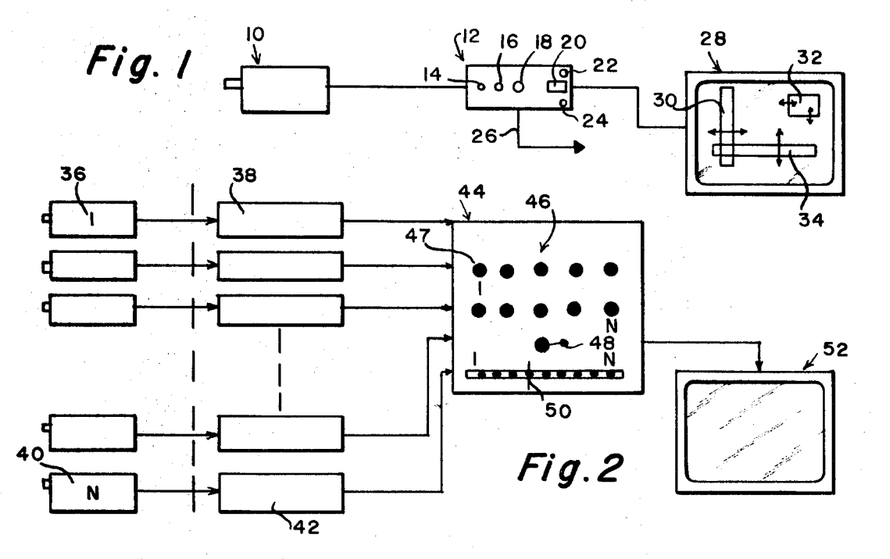
FIG. 1 is a diagrammatic illustration of a closed circuit television system with the motion detector unit.
FIG. 2 is a diagrammatic illustration showing a plurality of television surveillance cameras and motion detector units connected to a single video monitor.

The basic assembly is shown in FIG. 1. Video camera 20 is connected to the motion detector unit 12. The detector unit has a horizontal position control 14, a vertical position control 16, and mode control knob 18, sample display controls, 20 and alarm lamp 22 and reset switch 24. The alarm output from the detector unit is carried along line 26 to the alarm apparatus.

The television monitor 28 receives the television signals from the motion detector unit 12. The screen, for illustration purposes, shows the three modes of sample configuration, any one of which may be selected.

The vertical sample bar 30 can be used to select a small vertical area where motion is to be detected. It should be noted that the motion detector unit will only be activated by motion within the selected sample area, in this case, the vertical bar 30.

If desired, a rectangular sample area 32 may be selected, instead of the vertical bar, or if desired, a horizontal sample bar 34 may be selected as the sample area.

The sample area, whatever the configuration, may be moved to any desired position in the field of view displayed on the monitor, by adjustment of both the horizontal position control knob 14, and the vertical position control knob 16, of the motion detector unit 12. The particular type of mode, whether vertical bar, horizontal bar, or rectangular configuration, is selected by turning the mode control knob 18.

The sample display controls indicated at 20 on the motion detector control the brightness of the sample area displayed on the monitor screen. In addition, the brightened sample area may be displayed in a steady blink mode or may be deleted entirely from the screen.

The brightness is intensified in the sample area to draw attention to it, and to make it possible to easily observe the selected sample area format while positioning to the desired location for motion surveillance. When the horizontal position control knob 14 and the vertical position control knob 16 are used, the brightened sample area will be moved to any desired location. The sampling area in each of the three modes is approximately 8 percent of the total field of view of the television camera.

The intensity of the sampling area displayed on the television monitor can be deleted, if desired, so that it is indistinguishable from the remainder of the scene displayed on the monitor.

When movement sufficient to trigger the unit occurs in the sampling area, the alarm light 22 lights, the brightened sampling area begins to blink, and an alarm signal is sent along line 26 to the alarm device.

The motion detector unit does not require either a special camera or a special monitor. It is merely coupled in the line between existing closed circuit television camera and monitor units. The only requirement is that the camera be of the positive interlace type with either E.I.A. or standard industrial sync.

The motion detector unit has an automatic gain control which permits its use with cameras having different video output levels, without requiring special adjustment.

It has the capability of converting any positive interlace closed circuit television system to a motion detection and alarming system, sensing movement, either fast or slow in any part of the total field of view of the camera.

FIG. 2 illustrates the versatility and economies that can be effected in a closed circuit security system, using the motion detector unit. Referring particularly to FIG. 2, television camera number 1 shown at 36, is connected to its motion detector unit 38, this arrangement being made with a plurality of such pickup cameras up to camera N indicated at 40, and its corresponding motion detector unit 42. All of the motion detectors are connected to an automatic switching console 44, having a plurality of alarm indicator lamps, one for each video channel. For example, lamp 47 having numeral 1 below it would light when motion occurring in the sample area of camera 36 triggered the alarm output of motion detector 38. In addition, the video information from camera 36 would be passed through the console to the monitor unit. The automatic-manual control switch 48 permits the selection of any desired channel through the video channel select slide switch generally indicated at 50. There is one switch contact for each television camera to permit the security guard to select any desired camera for viewing. The video signal output from the automatic switching console 44 is fed to a single television monitor 52 for display.

In this system, the appropriate mode for sampling, either vertical or horizontal bar, or rectangular sample area, are selected and positioned as desired for its corresponding camera. The camera view with its sampling area will appear on the monitor screen.

The automatic switching console receives both the video signal and the alarm signal from a given motion detector unit. When the console is connected in automatic mode by means of switch 48, the alarm signal received from any one of the motion detector units will switch the video from the corresponding camera through the console 44 to the screen of the monitor 52. At the same time, the alarm signal triggers an aural alarm in the console, which is not shown.

It can be seen that the motion detector unit provides a great deal of versatility to existing closed circuit television systems, by providing for an automatic alarm when movement occurs. It should also be noted that the motion detector will sense smoke of flame entering the sample area, and has other uses with auxiliary equipment, such as process monitoring, counting of particles, speed detection, video tape recording, and many other uses.

The functional operation and circuitry of the motion detector unit is set forth in FIGS. 3 to 10. Basically, the video motion detector compares the total video information content of the sample area during two sequential and exact time periods. This is accomplished by using two electronic memory circuits which successively store the scans of the sample area and then the information in the circuits are compared. There will be no difference between the information in either of the two memory circuits if no movement has occurred. But, if movement has occurred, there will be a difference between the information in these memory circuits and circuitry will present a differential output. This output will trigger an external alarm circuit while simultaneously lighting the alarm lamp 22 on the panel of the motion detector unit 12.

Figure 3:
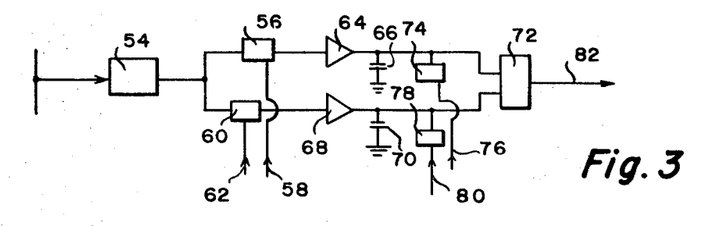
FIG. 3 shows a block diagram of the motion detector's video sample read, memory and comparator circuits.

Referring to FIG. 3, the composite video signal is supplied to the video separator and buffer amplifier unit 54, where it is supplied to the two lines, one going to the first memory sample gate 56, controlled by the input line signal 58, and the other portion of the signal being supplied to the second video sample gate 60, controlled by the second input signal line 62.

At time $T_1$, the sample area address control pulse train (see 169, FIG. 6) is sent in line 58 to permit passage of the video signal from the sample area to pass through the first memory sample gate 56 to the first memory constant current amplifier 64 and then to the first memory video signal storage capacitor 66 where it is stored. The signal stored is a one sweep pass of the sampling area, in the form of total voltage.

In similar manner, the signal for the second time interval is passed through the second video sample gate 60 at $T_2$ when its sample area control pulse train is transmitted to it through the second input signal line 62. The signal is passed through the second memory constant current amplifier 68 to the second memory signal storage capacitor 70 where it is stored.

The information if the capacitors 66 and 70 are then passed through a comparator circuit 72.

After comparison of the information is made, the first memory reset circuit 74 is activated by a pulse transmitted through reset signal line 76, clearing the first memory video signal storage capacitor 76 preparatory to receiving a third signal at time, $T_3$ for comparison with the video signal which still would be contained in the second memory video signal storage capacitor 70.

After comparison of these two signals in the comparator unit 72, the second memory reset circuit is activated by a signal transmitted through the second reset signal input line 80. Video information is then supplied to the second memory signal storage capacitor 70 at time $T_4$. This alternate store and comparison of signals is continuously repeated.

The comparator circuit 72 is a differential amplifier network which will produce an output in output signal alarm line 82 when there is a difference shown between the video signals stored in video signal storage capacitors 66 and 70.

Figure 4:
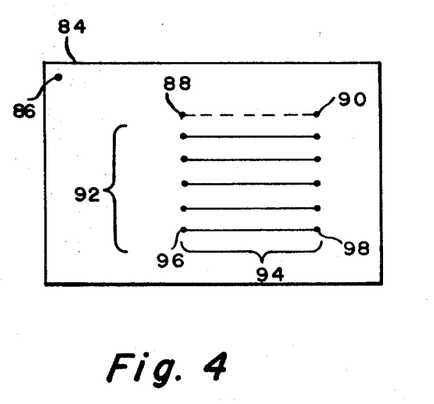
FIG. 4 shows a television monitor screen with an illustration of the sample area.

FIG. 4 shows the raster display on the television monitor generally indicated at 84. A general description of the technique for obtaining either a vertical or horizontal bar or a square will be presented herein, with a general description and block diagram illustration for purposes of illustrating the function thereof and its use in controlling the memory and comparator circuit to which this invention is primarily directed.

To obtain a sampling area a reference point 86 with coordinates $x_0$, $y_0$ at the upper left portion of the screen is used as a starting reference point. With appropriate delay and counter circuitry, using the vertical and horizontal synchronization signal of the incoming video signal from the camera, any desired starting point for the start of the scan sampling area can be obtained.

In FIG. 4, for example, the starting point for sampling of a selected area begins at the upper left at point 88 which corresponds to point $x_1$, $y_1$. The width of the sampling area extends to the right along line $y_1$ to the point 90 which has coordinates of $(X_1+\Delta X, Y_1)$. The vertical extent or $\Delta Y$ is indicated at 92. The horizontal extent of the sampling area or the $\Delta X$ dimension is indicated at 94. The lower left-hand corner of the sample area is indicated at 96 and has the coordinates $x_1$, $y_n$. The lower right-hand corner of the rectangular sampling area is shown at 98 and has the coordinates ($X_1+\Delta x$, $Y_n$).

Figure 5:
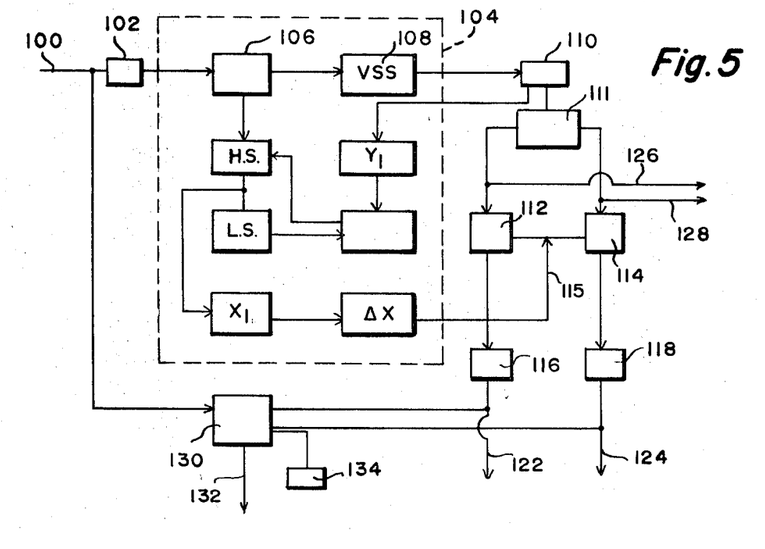
FIG. 5 is a block diagram illustrating the position logic, and the sample read out reset control circuits for the memory and comparator circuit.

The positioning and control logic block diagram is illustrated in FIG. 5, where the video input line 100 carries the signal from the television camera to the buffer video stripper and synchronization pulse amplifier unit 102, from where it passes to the positioning logic and sample control circuit generally indicated by the dotted outline at 104. The signal is received in the vertical synchronization separator circuit 106 from where it passes to the vertical synchronization signal shaper 108. From here the signal passes to the divide by two flip-flop circuit 110 and then divide by two flip-flop 111 from which signals are alternately passed to the sample duration gate 112 for controlling the first memory circuitry of the memory and comparator circuit of FIG. 3. Alternate signal outputs are passed to the second memory sample duration gate 114 from the flip-flop circuit 111.

The precise amount of time for each of the gates 112 and 114 to be in operation is controlled by the output of the positioning logic and sample control circuit which is supplied to gates 112 and 114 through line 115.

Direct amplification of the outcoming signal from the gates is provided by the buffer amplifiers 116 and 118, and the output from these amplifiers is the sample area address pulse train. The sample address to line 58 for the first memory video sample gate 56 of FIG. 3 is sent along line 122, while the sample control pulse from amplifier 118 is transmitted along line 124 to the second memory video sample gate 60 of FIG. 3 through line 62.

The duration of these control pulses are very accurately timed, and permit an electronic scan to be passed for only the area of interest, such as the sample area of FIG. 4. The signal passed will not be continuous but rather for only a portion of a line, such as the distance between points 88 and 90 of line $y_1$ of FIG. 4. Transmission of signal will be interrupted by the gate for the remainder of line $y_1$ after point 90 has been reached, and for the first portion of all of the succeeding lines for the particular sweep. All of the signals passed for the sweep would go to one of the two memories, and the signals for the succeeding sweep is passed onward to the other memory circuit. This results in the passing on to the memory circuit of only the signals for the desired sampling area, so that motion or change in the remaining portion of the field of view of the camera will not affect the detector circuit.

Reset pulses for the gates 74 and 78 leave the gate control circuit through output lines 128 and 126 which are respectively connected to the reset signal lines 76 and 80 of FIG. 3.

The incoming video receiving line 100 branches off to the display gate unit 130 from which the video output is transmitted along line 132 to the television monitor. A brightness control element generally indicated at 134 is shown. The buffer amplifiers 116 and 118 are connected to the display amplifier circuit 130 to permit a brightened sample display area.

Figure 6:
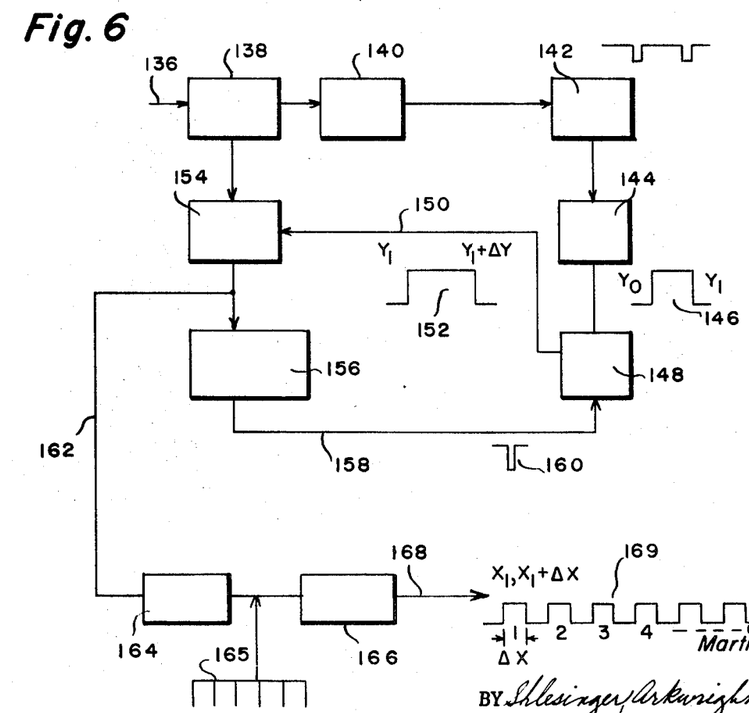
FIG. 6 is a block diagram showing in more detail the positioning logic circuitry.

A block diagram for the positioning logic and sample control circuit generally indicated at 104 of FIG. 5 is shown in FIG. 6. The video synchronizing pulses are supplied to the circuit along line 136 to the sync separator circuit 138 from which is transmitted directly to the vertical synchronization shaper circuit 140, and then directly to the divide by two flip-flop circuit 142. Blocks 138, 140 and 142 correspond to circuit blocks 106, 108 and 110 of FIG. 5. The vertical synchronization pulse is taken from one side of the divide by two flip-flop circuit 142 and transmitted directly to the $y_1$ delay monostable delay circuit. This circuit permits the $y_1$ starting point to be positioned at any horizontal line in the field of the raster of FIG. 4. The pulse output from circuit 144 is shown at 146, and is transmitted directly to the $\Delta Y$ control gate 148 which is a start-stop flip-flop circuit. Flip-flop 148 is turned on by the trailing edge of 146 at time $Y_1$. This pulse output is sent along line 150 which has a configuration generally indicated at 152 and enables a horizontal sync gate 154.

The horizontal sync passed through the circuit 154 after the turn on pulse is received from line 150 are transmitted to a line counter circuit 156 which is a programmable divide by N digital counter. When the $N^{th}$ horizontal sync pulse is counted, the output line 158 carries a pulse signal generally indicated at 160 back to the flip-flop 148 to reset this circuit to the off state. The counter is also simultaneously gated off.

As a result, precisely N pulses are produced at the horizontal sync gate circuit 154 and transmitted along line 162 to the $X_1$ monostable circuit 164. The pulse first drives the monostable circuit setting the starting point on each of all of the horizontal lines in the sample area. The delayed burst of line pulses is illustrated at 165.

The trigger burst of pulses 165 are received in the $\Delta X$ monostable delay circuit 166 which converts them to a rectangular pulse train to establish the length of each horizontal line segment in FIG. 4, the length of the pulse would correspond to $\Delta X$ indicated at 94.

The output from the $\Delta X$ monostable circuit 166 is carried along line 168 to line 115 of FIG. 5. The burst of control pulses from $x_1$ to $x_n$ for the sample area illustrated at 169. These pulses control the gates 112 and 114 of FIG. 5.

The burst of pulses supplied to the gates 112 and 114 from the position and control logic circuit 104 through line 115 is a plurality of N pulses, a pulse for each of the horizontal lines involved in the sample area, the duration of each of the pulses being identical and equal in duration to the transmission time for the video signal from points 88 to 90. For example, in FIG. 4, these pulses control the output signals transmitted along lines 112 and 124.

The length and duration of the pulses using this approach makes it possible to select any desired sampling area of the field of view of the camera. The control pulse burst 169 is produced for every alternate field transmission from the camera. That is, the same field of each frame.

Figure 7:
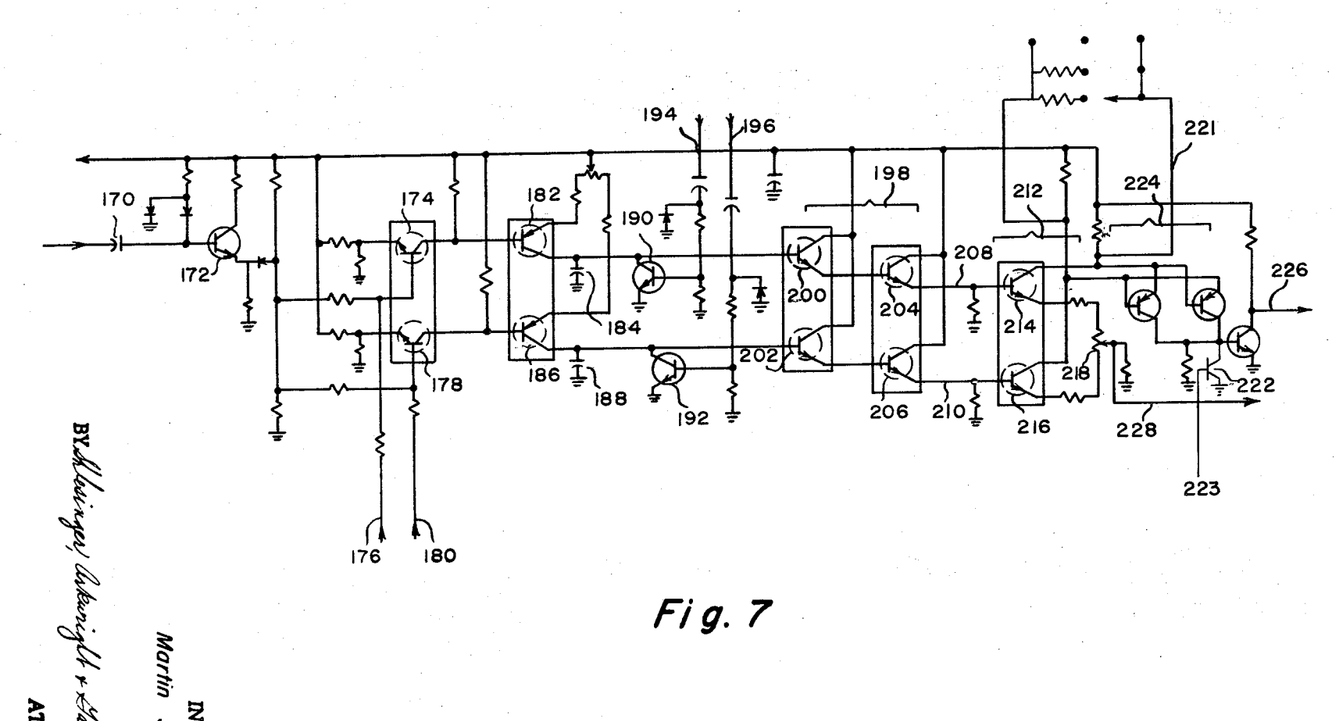
FIG. 7 shows the schematic for the Memory and Comparator circuit.

FIG. 7 shows the circuitry for the memory and comparator circuit, the operation of which is controlled by the output from the control circuit of FIG. 5.

The signal from the camera is supplied along input line 170 to the video separator and clamp circuit 172. The synchronization pulses are removed and the remaining video is clamped to a DC level.

The video output is now alternately fed through a pair of matched transistor gates, one for each memory circuit. One of the transistor gates 174, for memory circuit number 1, is controlled by gate pulses received along line 176 which is connected to the output line 122 of FIG. 5. The gate is turned on only for those portions of the video signal that are in the desired sampling area.

Similarly, the video gate 178 for the second memory circuit receives gate-on pulses along line 180 for the alternate sweep of the sampling area.

The output from the video gate 174 for memory number 1 is passed through a constant current charging amplifier 182, and the output therefrom charges memory number 1 storage capacitor, 184.

The memory storage capacitor 184 integrates every video charge received, with each successive horizontal video line progressively charging the storage capacitor 184. The amplitude of each charging step is directly proportional to both the line segment length and the video energy contained in that segment. Peak voltage amplitude on the capacitor after all video has been received is directly proportional to the total video energy contained in the sampling area.

Memory circuit number 2 operates in a similar way, with the video energy for the second sweep of the sampling are being applied to this memory circuit through current charging amplifier 186, the output of which is supplied to the second memory storage capacitor 188. Memory storage capacitors 184 and 188 are one percent tolerance matched units of mylar dielectric construction for low leakage and excellent stability.

Transistor reset gates 190 and 192 provide a means for discharging the capacitors 184 and 188 when control pulses are applied thereto through lines 194 and 196 respectively. A discharge control pulse is transmitted to the base of transistor reset gate 190 along line 194 from line 126 of the gate control logic. Reset pulse line 196 is connected to the base of reset gate transistor 192, the pulse being transmitted from the control circuitry through output line 128 of FIG. 5.

Referring to FIG. 5, it will be seen that the output pulses transmitted along line 126 and 128 come from either side of the divide by two flip-flop circuit 111. A balanced darlington amplifier circuit generally indicated at 198 consisting of two stages of matched pairs of amplifiers buffer the signals stored in memory capacitors 184 and 188 respectively. The amplifiers have a very high impedance, on the order of 50 to 100 megohms, so that a constant voltage can be held on the memory storage capacitors without energy loss.

The second stage of the amplifier circuit includes the matched transistor amplifier unit 204 and 206. It should be noted that with the use of closely matched transistors as part of the amplifying circuit, inaccurate reflection of the voltage in each of the memory circuits can be expected on output lines 208 and 210.

The output from the amplifier circuit is supplied to the differential comparator circuit 212, with the first memory output being supplied along line 208 to the matched amplifier 214, while the output from the second memory circuit is supplied to the base of matched transistor 216. The emitters of matched transistors 214 and 216 are connected to an adjusting potentiometer 218 which provides a ground return.

Alarm detect circuit 224 is an absolute magnitude detector which provides a positive alarm pulse at the junction of both collectors independent of the polarity output of the differential comparator amplifier circuit 212. Continuous readings are made in the differential comparator circuit 212, but the alarm read gate 222 is only actuated at those instants that pulses are reviewed along line 223. If there is a difference in the outputs coming from the two memory circuits at the time the alarm read gate is activated an output alarm pulse will be transmitted along line 226.

OPERATION OF MEMORY AND COMPARATOR CIRCUIT

In FIG. 7, the incoming video supplied along line 170 to the video separator circuit 172, the output of which is parallel with the first and the second memory circuits. The input to these memory circuits are respectively controlled by the matched video gate transistors 174 and 178. These gates are alternately activated for succeeding sampling area scans to provide continuous alternating sampling signals to the first and second memory circuits.

The control pulses are transmitted to the gates in a series of controllable pulse groups, the duration of the entire pulse group being the length of time for a scan of the sampling area chosen for observation. The length of the individual pulses reflect the width of the sampling area in each horizontal line. Each control pulse thereby permits only the video energy obtained from each horizontal line in the sampling area to the be transmitted through the constant current charging amplifier to be stored in the memory storage capacitor.

As indicated previously, the memory storage capacitor integrates every video charge it receives resulting in an accumulated charge which is directly proportional to the line segment length in a horizontal line and the video energy contained in that segment. Peak voltage amplitude on the memory capacitor is directly proportional to the total video energy contained in the sampling area.

This accumulated voltage is amplified and passed on to the differential comparator which functions continuously. The comparison between charges in the first and second memory circuits is only required at the end of each field scanned, and this is controlled by the alarm read gate 222 which in turn is activated by control pulses received along line 223. These alarm read pulses are formed by two 200 microsecond monostable circuits, not shown, which are activated by pulses transmitted along lines 126 and 128. This reading is taken at the end of each sample field during the vertical blanking and retrace from the camera.

The memory reset pulses which are derived from the trailing edge of the alarm read pulses are transmitted along lines 194 and 196 respectively to the reset transistor gates 190 and 192. When these gates are activated, a direct connection to ground is made, discharging the memory storage capacitor 184 and 188. The control pulse for the first memory reset gate 190 is transmitted along 194 is obtained from the second memory gate logic control circuit where the pulse is transmitted along line 128. The control pulse for activating the second memory reset gate 192 is supplied along line 196, the trigger being supplied from the first memory logic circuit output line 126.

AUTOMATIC GAIN CONTROL CIRCUIT

Figure 8:
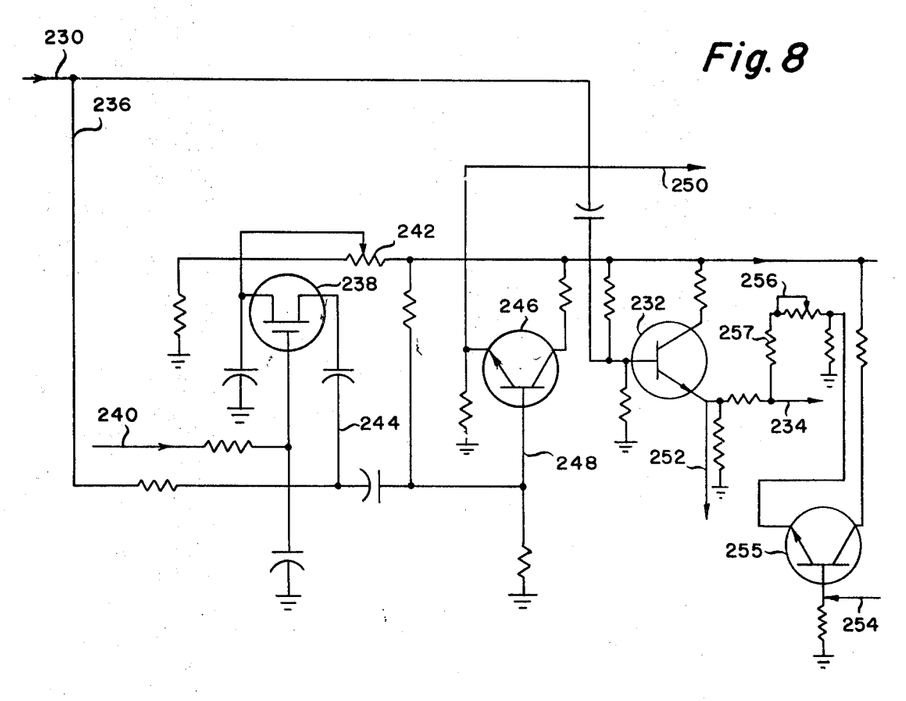
FIG. 8 shows the automatic gain control circuit.

The automatic gain control circuit is shown in FIG. 8 which receives video energy level information from the differential comparator circuit of FIG. 7 through line 228 which is directly connected to the tap of potentiometer 218. The video signal from the camera is supplied along line 230 where it is passed through amplifier 232, and to TV monitor input line 234.

The video signal is also supplied in parallel to line 230 along line 236 to the video automatic gain control. This consists of the field effect transistor 238 to which a DC level signal is supplied along line 240 from line 228 of the differential comparator circuit of FIG. 7, to gate the field effect transistor 238. The AGC setting of field effect transistor 238 is adjusted by the potentiometer 242. The field effect automatic gain control transistor is connected to the video line 236 through line 244.

The amplifier 246 is controlled by the signal supplied to its base along line 248 which is in series with the video input line 236. The output from amplifier 246 is applied along line 250 directly to the video input line 170 of the memory and comparator circuit of FIG. 7.

It will be seen that the signal applied along line 240 to the gate of the field effect transistor 238 will in effect vary linearly the resistance of that element, thereby changing the resistive path along line 244 to ground, to effect the input to the base circuit 248 of amplifier 246.

The brightness of the sampled area illustrated on the television monitor 28, is controlled by the brightness display circuit illustrated in FIG. 8. The brightness display is controlled by the pulse input to the logic circuit 130 of FIG. 5. This line 132 of FIG. 5 is connected to input line 254 of FIG. 8, which controls display buffer 255 (shown generally at 130 in FIG. 5). The output from buffer 255 is connected through adjustable potentiometer 256 in line 257 to the video monitor line 234. When the control pulses are received at the buffer 255 an additional intensity for the duration of the pulses, will be displayed on the video monitor screen. The potentiometer 256 is adjustable so that the brightness can be increased or decreased. The adjustable brightness display potentiometer 256 is indicated generally in FIG. 5 at 134.

To provide a warning in the event of failure of the video camera, a video malfunction line is connected to the output of the direct video signal amplifier 256. This is directly connected to a level comparator circuit, not shown, which will emit a pulse to be transmitted to the alarm circuit of FIG. 9.

Figure 9:
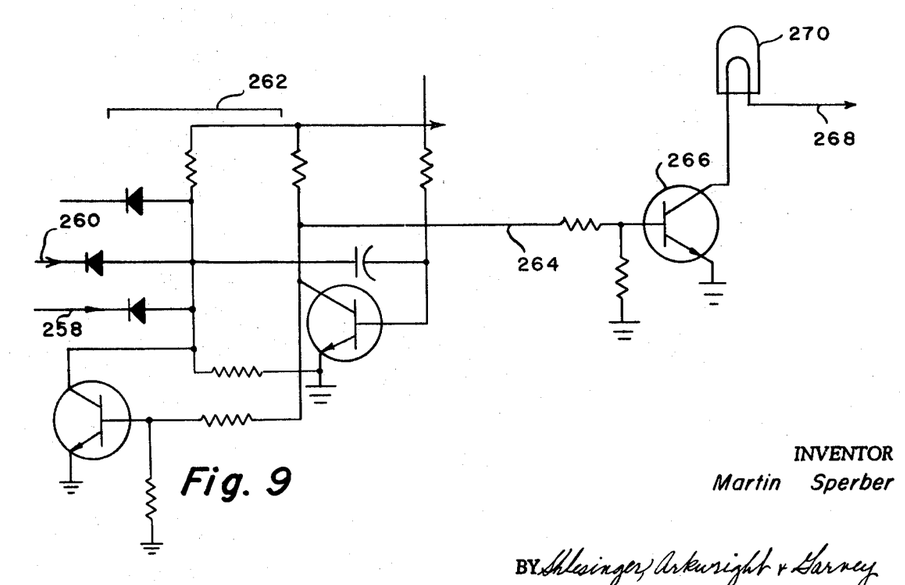
FIG. 9 shows the alarm output circuit.

Referring particularly to FIG. 9, a video malfunction line 258 supplies an input to the circuit, together with the alarm line 260, the latter being directly connected to alarm line 226 of FIG. 7.

Monostable circuit 262 generates the alarm pulse, transmitting it along line 264 to the alarm amplifier 266. The pulse output is transmitted in the alarm line 268 and through the alarm lamp 270 and external relay. The alarm lamp 270 corresponds to the alarm lamp 22 of FIG. 1.

In reference to FIG. 2, which shows the multiple camera and automatic switching console, the television signal output of video line 234 and the alarm line 268 for each of the motion detector units are both connected to the automatic switching console 44. Each video motion detector monitor line is gate or switch connected to a common output signal video monitor line connected to the monitor 52 of FIG. 2. The gate or switch connection of a given motion detector to the common video monitor line is open until closed by a pulse received from that monitor line. In automatic operation, circuitry, either transistor gates or relays, are employed for the switching function. Manual selection of a given camera output can be made by direct switch connection controlled by the camera picture control switches 50, shown in FIG. 2.

Figure 10:
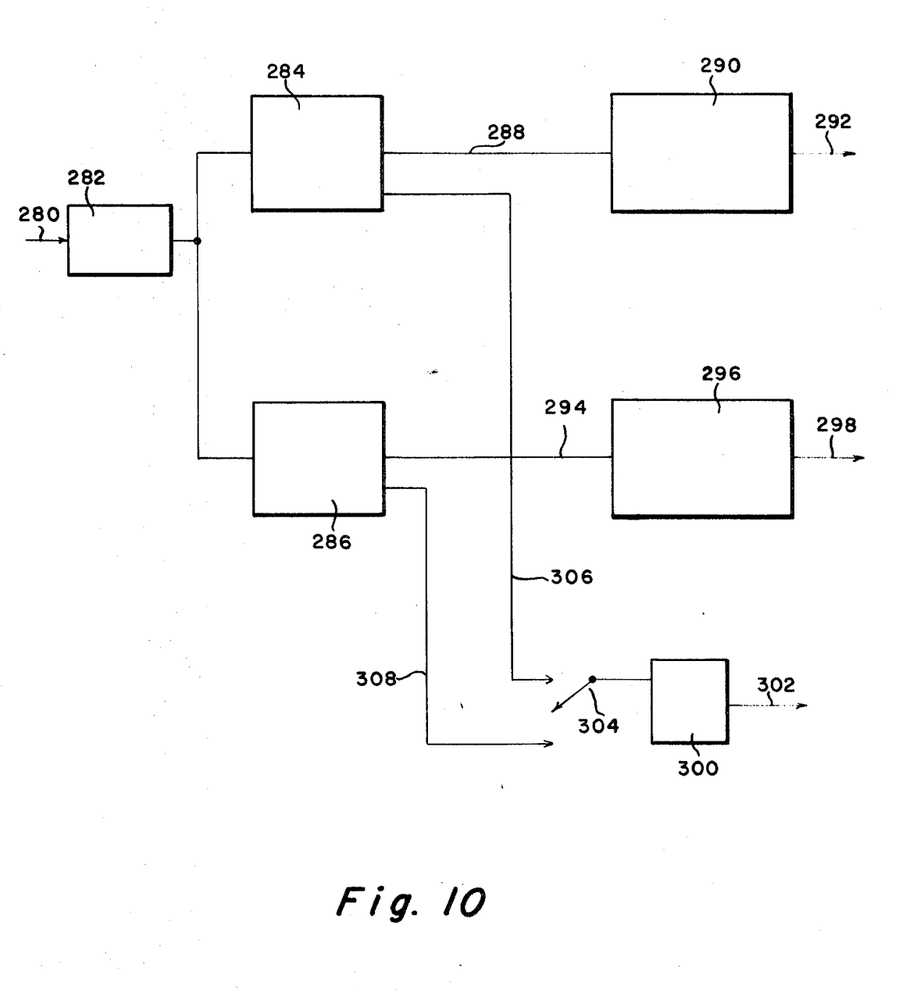
FIG. 10 is a block diagram showing both high and low speed sample and memory gates in circuit.

In FIG. 10, a block diagram is shown which illustrates the manner in which several simultaneous readings of motion at different speeds can be made. It has been possible with motion detection units constructed in accordance with this invention to detect movement as slow as a few inches a second, and as fast as 100 miles per hour.

FIG. 10 illustrates in general block outline the basic circuit arrangement illustrated in greater detail in FIG. 5, but shows an additional timing sample control pulse generator circuit. The sample and comparator circuits illustrated in FIGS. 3 and 7 are represented in block form and shown in this circuit also.

Referring specifically to FIG. 10, the video input line 280, equivalant to line 100 of FIG. 5 supplies the video signal to the positioning and control circuits 282. These circuits represent the positioning and control circuit 104 of FIG. 5, generally indicated in dotted outline.

A high speed sample timing generator 284 and a low speed sample timing generator 286 are connected in parallel to the output from the positioning and control circuit 282. The high speed sample timing generator 284 represents the circuitry of FIGS. 5 shown by blocks 111 through 118. The sample area address pulse train is transmitted along line 288, which represents both lines 122 and 124 of FIG. 5. The sample area address pulse train transmitted along line 188 is supplied to the high speed sample hold and comparison circuit 290, which represents the circuit of FIGS. 3 and 7. Output line 292 carries the alarm output, which represents line 226 of FIG. 7.

The additional low speed sampling circuitry is provided by the low speed sample timing generator circuit 286, which is similar to the circuitry of the high speed sample generator 284, representing the circuitry of blocks 111 through 118 of FIG. 5, but it includes a divide by N counter and several flip-flop circuits, which would be incorporated in the circuitry block represented by block 111 in FIG. 5. As a result, the frequency of control pulses at the output is much less than the frequency of the vertical synchronization pulses received at the input to the circuit. Preferably, a rate, which samples the same field every 16th frame is used, although any desired rate may be selected.

The output line 294 carries the lower frequency sampling pulses to the low speed sample hold and comparison circuit, which is identical with the comparison circuit 290. The low speed pulse output line 298 transmits an alarm signal to the alarm circuit of FIG. 9 along line 261. The low speed alarm signal from comparator circuit 290 is connected to line 260 of the alarm circuit by line 292.

The display control circuit 300, equivalent to display circuit 130 of FIG. 5, is connected to display buffer input line 254 of FIG. 8 along line 302. Switch 304 permits selection of either high or low speed display by connecting output lines 306 or 308 respectively to timing generator control circuits 284 and 286. Each of these single lines 306 and 308, represent a double line connection, as indicated by the lines in FIG. 5 connecting block 130 and lines 122 and 124, for example.

SUMMATION

It can thus be seen that the system described provides a versatile unit which can be effectively substituted in any video system without modification.

It is also possible to use a plural motion detector system with the automatic switching console wherein any one camera may be selected for viewing on the monitor, and the output alarm circuit of every one of the motion detector units connected to the console will trigger automatic switching circuitry for immediately displaying that video camera on the monitor in which motion has been detected.

The motion detector unit itself provides a new approach to motion detection wherein comparison is made of selected successive sweeps of a desired sampling area, video signals of each of said sweeps of a desired sampling area, video signals of each of said sweeps being alternately stored in plural memory circuits.

The use of an electronic memory system is made possible by the careful selection of matched components for each of the memory circuits so that accumulated electrical charges can be stored in a capacitor acting as a memory unit, and wherein a change in video signal input will be reflected in change in the accumulated charge on the capacitor.

Effective scanning of sampling areas and transmission to the memory circuit together with clearing of these memory circuits in successive order is made possible by the use of special logic, delay, and gating circuits activated by the horizontal and vertical synchronization pulses.

The motion detector system is compatible with any positive interlace television system and can merely be plugged into circuit between the camera and monitor because of a unique circuit employing a field effect transistor.

The automatic gain control circuitry of the motion detector unit permits it to be used with different cameras without requiring special adjustment for energy levels. In addition, this circuit will provide automatic correction of light levels within the field of view of a camera.

The use of two sampling gate and comparator circuits permits motion detector samplings to be made for different rates of movement, substantially increasing the application and use of the unit.

It should be noted, with respect to security systems, that the motion detector unit has a fail-safe circuit which provides a means for actuating the alarm whenever the video camera signal is interrupted.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

Having thus described my invention, what I claim is:

1. A closed circuit television motion detector system, comprising:
   a. a video camera,
   b. motion detector means connected to said camera for receiving the video signal from the camera and sampling a preselected sampling area,
   c. the motion detector means including positioning logic and counter circuitry referenced to the video signal synchronization pulses for permitting variance of size and change of location of the sampling area within the field of view of the video camera,
   d. the motion detector means also including comparison means for receiving signals from the sampling area in successive scans and comparing the successive signals,
   e. a television monitor connected to said motion detector means for receiving and displaying the entire field of view of the video signal,
   f. means for displaying on the TV monitor the preselected sampling area, and
   g. said motion detector means having an alarm circuit for signalling when the comparison means detects a change between successive scans of the sampling area.

2. The closed circuit motion detector system as set forth in claim 1 wherein:

a. said motion detector means includes automatic gain control circuitry to permit said motion detector to be connected to a camera and monitor system of varying energy level without requiring adjustment and to provide automatic correction of varying light levels within the total field of view of the camera.

3. The closed circuit television motion detector system as set forth in claim 1 wherein;
   a. said motion detector means includes means for activating the alarm circuit when the video camera signal is interrupted.

4. The closed circuit television motion detector system as set forth in claim 1 wherein:
   a. said motion detector means includes a plurality of electronic signal storage circuits for successively receiving said video signal scans of a sampling area.

5. The closed circuit television motion detector system as set forth in claim 1 wherein:
   a. the means for displaying the sampling area on the monitor screen includes a video sample display brightness control means for providing a brightened sampling area display.

6. A plural channel closed circuit motion detector system, comprising:
   a. a plurality of closed circuit television cameras,
   b. a motion detector unit connected to the output of each television camera and having a video output line and an alarm line,
   c. each motion detector unit including positioning logic and counter circuitry referenced to the video signal synchronization pulses for varying the size and location of the sampling area within the field of view of its corresponding video camera,
   d. a common automatic switching console to which the video output and the alarm lines of each of said motion detector units are connected,
   e. said console being connected to a television monitor,
   f. automatic circuitry within said console for connecting the video output of a given motion detector unit to the monitor when an alarm signal is received from that motion detector unit.

7. The plural channel closed circuit television system as set forth in claim 6 wherein:
   a. said automatic switching console includes individual manual switch means for connecting the video output of any camera to said television monitor.

8. The plural channel closed circuit television system as set forth in claim 6 wherein:
   a. said automatic switching console has an indicator panel with a plurality of lamps, one for each closed circuit television camera, which are lit and its corresponding video camera signal displayed on said television monitor when its motion detector unit transmits an alarm signal to said console.

9. A motion detector unit for use with a closed circuit television system, comprising:
   a. receiving means for receiving a video camera output signal,
   b. signal isolation means for isolating the horizontal and vertical synchronization pulses from the video signal,
   c. control pulse generating means including logic and counter circuitry for receiving the horizontal and vertical synchronization pulses and emitting a control pulse,
   d. gate means connected to the output of the receiving means and to the control pulse means for passing the video signal therethrough subject to the control pulse received from the control pulse means,
   e. electrical storage means connected to the gate means for electrically receiving and storing the video signals passed through the gate means,
   d. electrical comparison means connected to the storage means for comparing successive video signals stored in the storage means, and
   e. means connected to the electrical comparison means for emitting a signal when there is more than a preselected change in successive video signals stored in the electrical storage means.

10. The motion detector unit as set forth in claim 9, wherein:
    a. the electric storage means includes a capacitive storage circuit.

11. The motion detector unit as set forth in claim 10, wherein:
    a. a constant current amplifier is connected between the gate means and the capacitive storage circuit.

12. A motion detector unit for use with a closed circuit television system, comprising:
    a. a video camera sweep signal receiving means for receiving a television signal, and for transmitting it to a television receiver,
    b. a pair of matched electronic memory storage circuits connected to said signal receiving means, and to which successive identical sampling area video camera signals are alternately applied,
    c. separate gate means connected between each of the electronic memory storage circuits and the sweep signal receiving means and including positioning logic and counter circuits responsive to the horizontal and vertical synchronization pulses, each of which are alternately gated for selecting and passing to their respective electronic memory storage circuits any desired portion of the video signal representing a variable size and movable sampling area of the field of view of the camera,
    d. an electronic comparator network connected to said electronic memory storage circuits to detect a difference in successive video camera sweep signals,
    e. an alarm circuit connected to said electronic comparator network for sending an alarm signal when the difference in successive video camera sweep signals is detected.

13. The motion detector unit of claim 12 wherein:
    a. the gate means includes frequency sampling control means for decreasing the number of frames of the video signal scanned, for permitting measurement of different rate movements.

14. The motion detector unit as set forth in claim 12 wherein:
    a. automatic gain control circuitry is connected to the video camera signal receiving means and to the output of the electronic comparator network for control of the output signal level transmitted to the television receiver and the matched electronic memory storage circuits,
    b. the automatic gain control circuit includes a field-effect transistor, the gate of which is connected to the electronic comparator network.

15. The motion detector unit of claim 12 wherein:
    a. a vertical monostable delay circuit is activated by the vertical synchronization pulse to define the upper horizontal line of the sampling area,
    b. a monostable circuit is activated by the horizontal synchronization pulse to determine the left-hand margin of the sampling area.

16. A closed circuit television motion detector system, comprising:
    a. a television camera for producing a video signal of the field being scanned,
    b. a motion detector unit connected to said television camera for receiving and comparing selected successive video cans of a desired sampling area of said field,
    c. a television monitor for displaying the field of said television camera,
    d. said motion detector unit having means to connect said video television camera and said television monitor.
    e. gate means controlled by pulse generating means operated by the horizontal and vertical synchronization pulses of said television camera for passing only the video signals from a desired sampling area to said motion detector unit, and f. video display control means connected to said transmitting means and controlled by said gate means for sending a video signal to said television receiver resulting in a brightened display area on the television receiver screen.

17 A motion detector unit for use with a closed circuit television system, comprising:
  a. means for receiving successive identical sampling area video camera signals and for separating the video signals from the horizontal and vertical synchronization pulses,
  b. a pair of individual matched electronic memory storage units to which the successive video signals are alternately applied,
  c. said memory unit including a transistor control gate connected to said signal receiving means for passing the video signal,
  d. a constant current transistor amplifier connected to said transistor gate,
  e. a large storage capacitor being charged by said constant current amplifier,
  f. a pair of matched transistor amplifiers having a high input impedance,
  g. the base of one transistor being connected with the constant current amplifier output and the storage capacitor of the first memory unit, and the second transistor being connected in parallel with the constant current amplifier output and the storage capacitor of the second memory unit,
  h. said matched transistors being connected to provide a differential amplifier circuit,
  i. a reset gate circuit connected to each of said storage capacitors to provide a means for discharging said capacitors,
  j. control pulse means activated by the horizontal and vertical synchronization signals of said video camera to alternately activate the control gates of said pair of memory storage units for selected successive frames of video signals,
  k. said control pulse means also acting to control said reset gate circuits to provide for alternate discharge of said capacitor therethrough following differential comparison of the capacitive charges at the end of each selected video camera sweep,
  l. output alarm means connected to said differential amplifier circuit to give an alarm signal when there is a difference in charge on said storage capacitors.

18. The motion detector unit for use with a closed circuit television system as set forth in claim 17 wherein:
  a. said motion detector unit includes a filed effect transistor circuit in circuit therewith for supplying automatic gain control for the unit and,
  b. said output alarm circuit includes circuitry to activate the alarm in the event of failure of the video signal.